US012720463B2

(12) United States Patent
Duan et al.

(10) Patent No.: US 12,720,463 B2
(45) Date of Patent: Aug. 25, 2026

(54) CLUTTER INFORMATION-AIDED RADIO FREQUENCY (RF) SENSING

(71) Applicant: QUALCOMM Incorporated, San Diego, CA (US)

(72) Inventors: Weimin Duan, San Diego, CA (US); Hyojin Lee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 710 days.

(21) Appl. No.: 18/169,615

(22) Filed: Feb. 15, 2023

(65) Prior Publication Data

US 2024/0276418 A1 Aug. 15, 2024

(51) Int. Cl.
*H04W 64/00* (2009.01)

(52) U.S. Cl.
CPC .................................. *H04W 64/00* (2013.01)

(58) Field of Classification Search
CPC ..... H04W 24/08; H04W 4/027; H04W 64/00; H04W 64/006; H04W 76/12; H04W 8/005
USPC ....... 455/456.1, 12.1, 13.1, 457, 422.1, 418, 455/456.6
See application file for complete search history.

(56) References Cited

U.S. PATENT DOCUMENTS 8,494,464 B1* 7/2013 Kadambe ................ H04K 3/45 455/67.11
2006/0264168 A1* 11/2006 Corbett ................. H04K 3/827 455/1
2010/0281339 A1* 11/2010 Myers .................. H04L 1/0038 714/752
2017/0318497 A1* 11/2017 Tranquilli, Jr. ........ H04K 3/226
2019/0230740 A1* 7/2019 Porter .............. H04W 56/0015
2020/0296680 A1* 9/2020 Akkarakaran ........ H04W 4/029
2022/0082653 A1 3/2022 Manolakos et al.
2022/0113400 A1 4/2022 Manolakos et al.
2023/0258457 A1* 8/2023 Jiang ................... G08G 1/0141 701/446
2023/0284251 A1* 9/2023 He ....................... G01S 7/0232 370/329
2024/0036166 A1* 2/2024 Geng ..................... G01S 7/412
(Continued)

FOREIGN PATENT DOCUMENTS

WO 2022107050 A1 5/2022

OTHER PUBLICATIONS

International Search Report and Written Opinion—PCT/US2024/014081—ISA/EPO—Jun. 11, 2024.
(Continued)

*Primary Examiner* — Joseph Arevalo
(74) *Attorney, Agent, or Firm* — QUALCOMM Incorporated

(57) ABSTRACT

In an aspect, a UE obtains assistance data based on a set of clutter measurements associated with a plurality of network nodes, updates an RF sensing session based on the assistance data, and performs a set of measurements based on the updated RF sensing session. In another aspect, a network entity provides a first indication of a signaling scheme for a set of clutter measurements associated with a plurality of network nodes, receives, based on the signaling scheme, a second indication of the set of the clutter measurements from the plurality of network nodes, and provides, for a UE, assistance data based on the set of clutter measurements.

27 Claims, 11 Drawing Sheets

(56) References Cited

U.S. PATENT DOCUMENTS

| | | | | |
|---|---|---|---|---|
| 2024/0171298 | A1* | 5/2024 | Breuer | H04K 3/226 |
| 2024/0179494 | A1* | 5/2024 | Säily | H04W 4/029 |

OTHER PUBLICATIONS

Meng K., et al., "UAV-Enabled Integrated Sensing and Communication: Opportunities and Challenges", arxiv.org, Cornell University Library, 201 Olin Library Cornell University Ithaca, NY 14853, Sep. 20, 2022, XP091321256, pp. 1-8, Sections II- IV, figures 3,6.

* cited by examiner

500

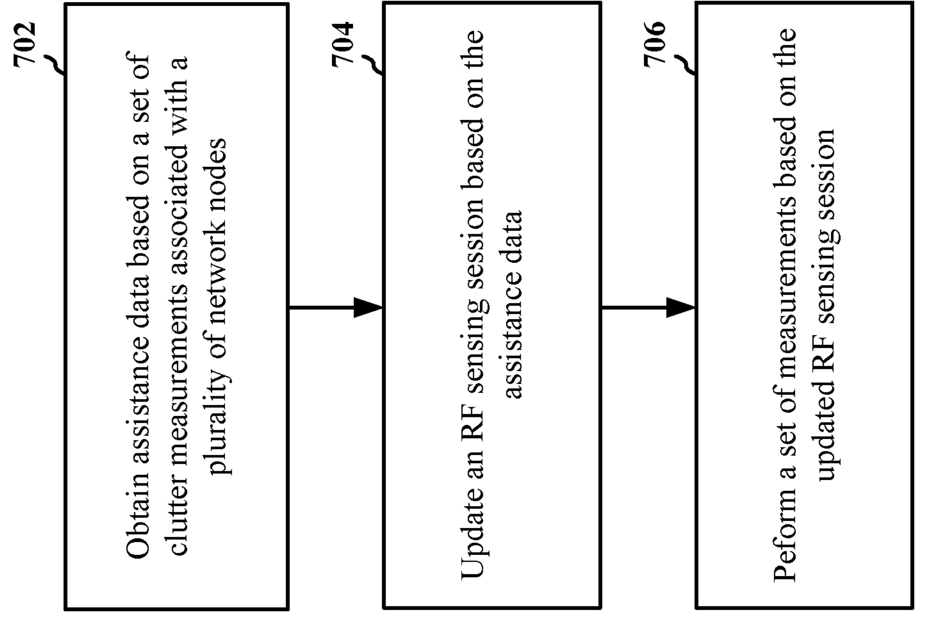
FIG. 7
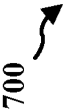

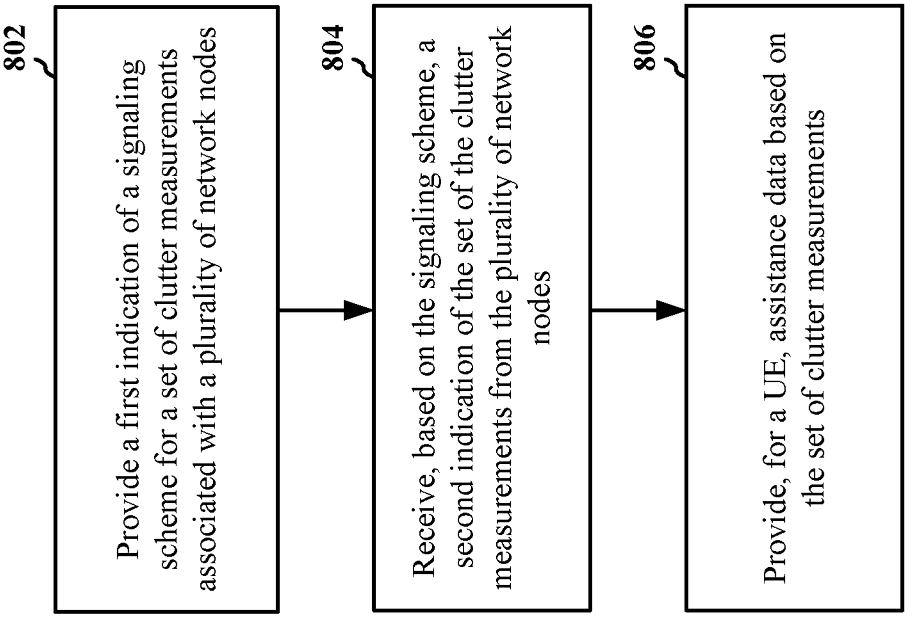
FIG. 8
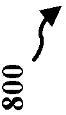

CLUTTER INFORMATION-AIDED RADIO FREQUENCY (RF) SENSING

TECHNICAL FIELD

The present disclosure relates generally to positioning systems, and more particularly, to positioning systems involving clutter information.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include memory and at least one processor coupled to the memory. The at least one processor, based at least in part on information stored in the memory is configured to: obtain assistance data based on a set of clutter measurements associated with a plurality of network nodes, update a radio frequency (RF) sensing session based on the assistance data, and perform a set of measurements based on the updated RF sensing session.

In another aspect of the disclosure, a method, a computer-readable medium, and an apparatus are provided. The apparatus may include memory and at least one processor coupled to the memory. The at least one processor, based at least in part on information stored in the memory is configured to: provide a first indication of a signaling scheme for a set of clutter measurements associated with a plurality of network nodes, receive, based on the signaling scheme, a second indication of the set of the clutter measurements from the plurality of network nodes, and provide, for a user equipment (UE), assistance data based on the set of clutter measurements.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a flowchart illustrating methods of wireless communication at a UE in accordance with various aspects of the present disclosure.

FIG. 8 is a flowchart illustrating methods of wireless communication at a network entity in accordance with various aspects of the present disclosure

DETAILED DESCRIPTION

Figure 1:
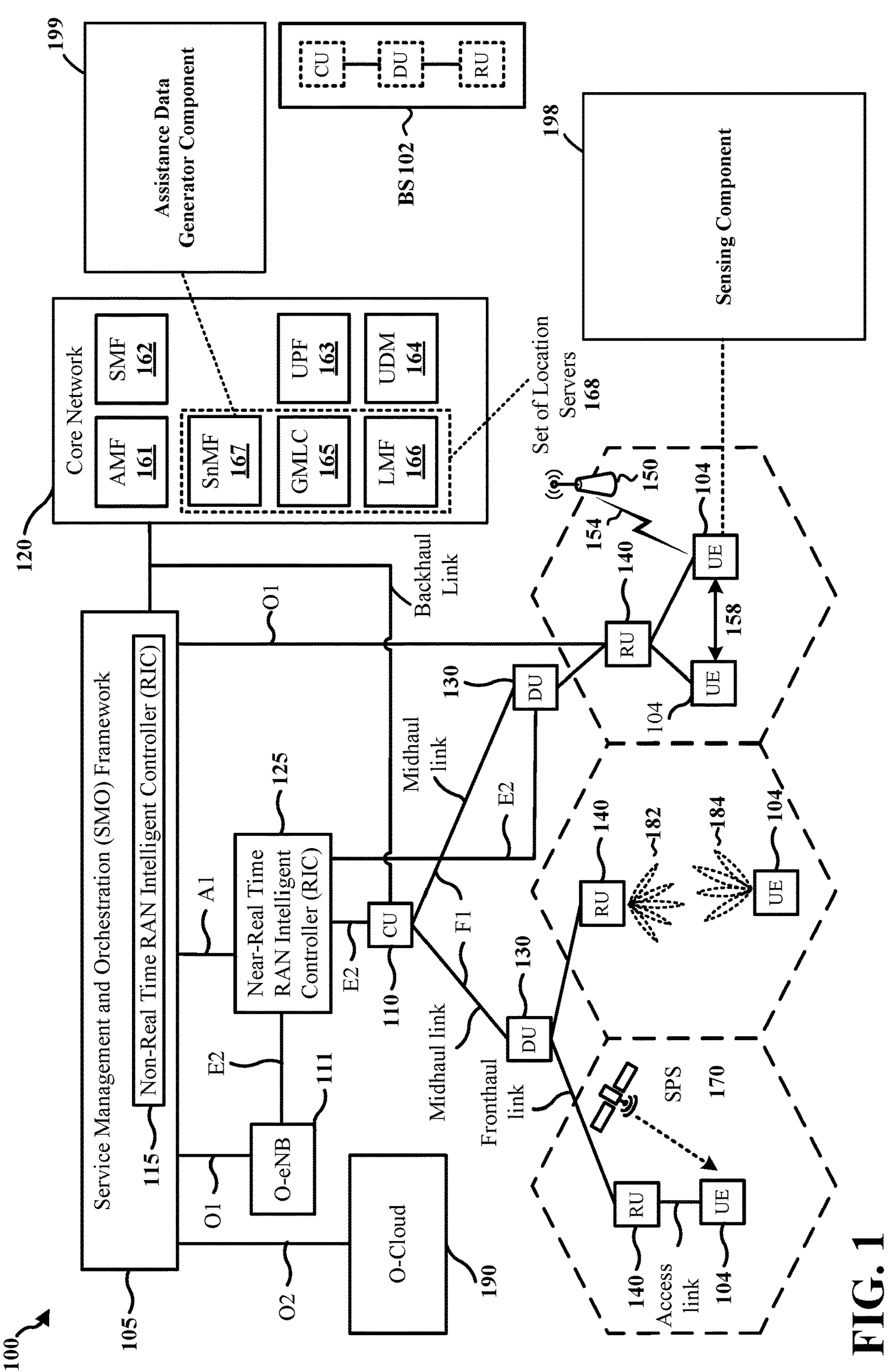
FIG. 1 is a diagram illustrating an example of a wireless communications system and an access network.

Various aspects relate generally to positioning systems. Some aspects more specifically relate to RF sensing that utilizes clutter information. In some examples, a sensing management function (SnMF) of a cellular network obtains clutter measurements from a plurality of network nodes. The SnMF determines a clutter distribution of an environment for which the network nodes provide coverage based on the clutter measurements. The SnMF provides the clutter distribution as assistance data to a sensing node. The sensing node performs an RF sensing session based on the assistance data. In addition to including the clutter distribution, the assistance data may also include transmit beam patterns of the network nodes, transmit beam-specific clutter information, and serving qualities of sensing areas.

Particular aspects of the subject matter described in this disclosure can be implemented to realize one or more of the following potential advantages. In some examples, by utilizing the assistance data to perform an RF sensing session, the described techniques enable the sensing node to more accurately detect and track a target entity as it navigates through its environment including the clutter. In addition, by utilizing the transmit beam patterns, the sensing node may determine which transmit beams provide adequate coverage for a certain target angle-of-departure (AoD) and utilize such transmit beams during a sensing session. By selectively utilizing such transmit beams (rather than all transmit beams), the sensing node is able to conserve power. Moreover, by utilizing the transmit beam patterns, the sensing node may compensate transmit beamforming loss across different angles to fine tune its array signal processing algorithm to enhance its AoD estimation accuracy. By utilizing the transmit beam-specific clutter information, the sensing node may reject certain reference signal measurements associated with a particular transmit beam if the clutter information for that beam indicates that the reference signals are indicative of clutter. This aids the sensing node to reject clutter, thereby improving its AoD estimation accuracy. By utilizing the serving qualities of sensing areas, the sensing node may bypass RF sensing activity for areas having a relatively low serving quality, thereby enabling the sensing node to conserve power.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165, a Location Management Function (LMF) 166, and a Session Management Function (SnMF) 167. However, generally, the one or more location servers 168 may include one or more location/positioning servers, which may include one or more of the GMLC 165, the LMF 166, the SnMF 167, a position determination entity (PDE), a serving mobile location center (SMLC), a mobile positioning center (MPC), or the like. The GMLC 165, the LMF 166, and the SnMF 167 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The SnMF 167 receives clutter measurements associated with an environment and generates assistance data based on the clutter measurements. The SnMF 167 provides the assistance data to a sensing node, and the sensing node performs a sensing session based on the assistance data. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a sensing component 198 that may be configured to obtain assistance data based on a set of clutter measurements associated with a plurality of network nodes, update a radio frequency (RF) sensing session based on the assistance data, and perform a set of measurements based on the updated RF sensing session. In certain aspects, the SnMF 167 may have an assistance data generator component 199 that may be configured to provide a first indication of a signaling scheme for a set of clutter measurements associated with a plurality of network nodes, receive, based on the signaling scheme, a second indication of the set of the clutter measurements from the plurality of network nodes, and provide, for a user equipment (UE), assistance data based on the set of clutter measurements.

Figures 2A, 2B, 2C, 2D:
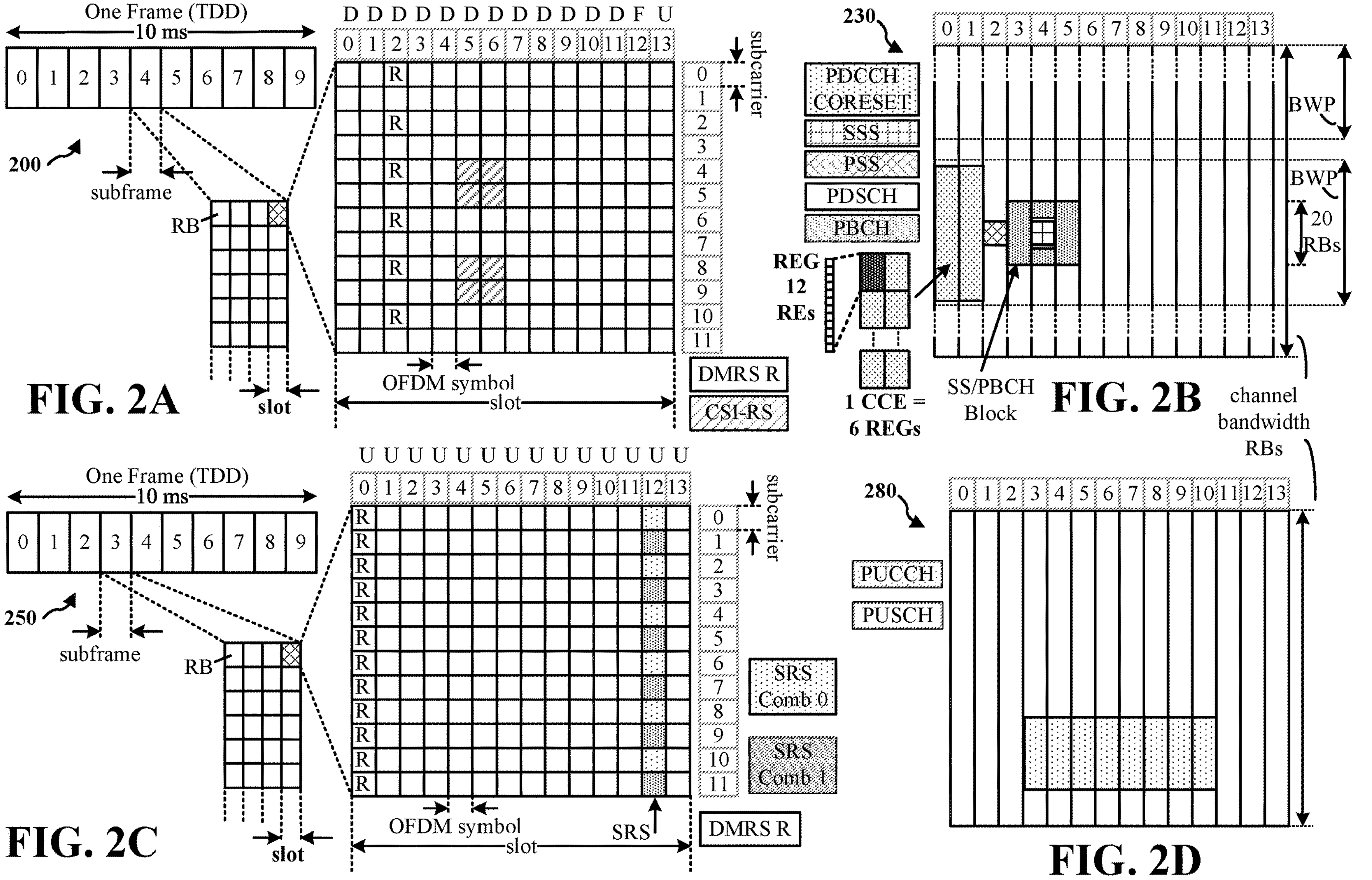
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology p, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
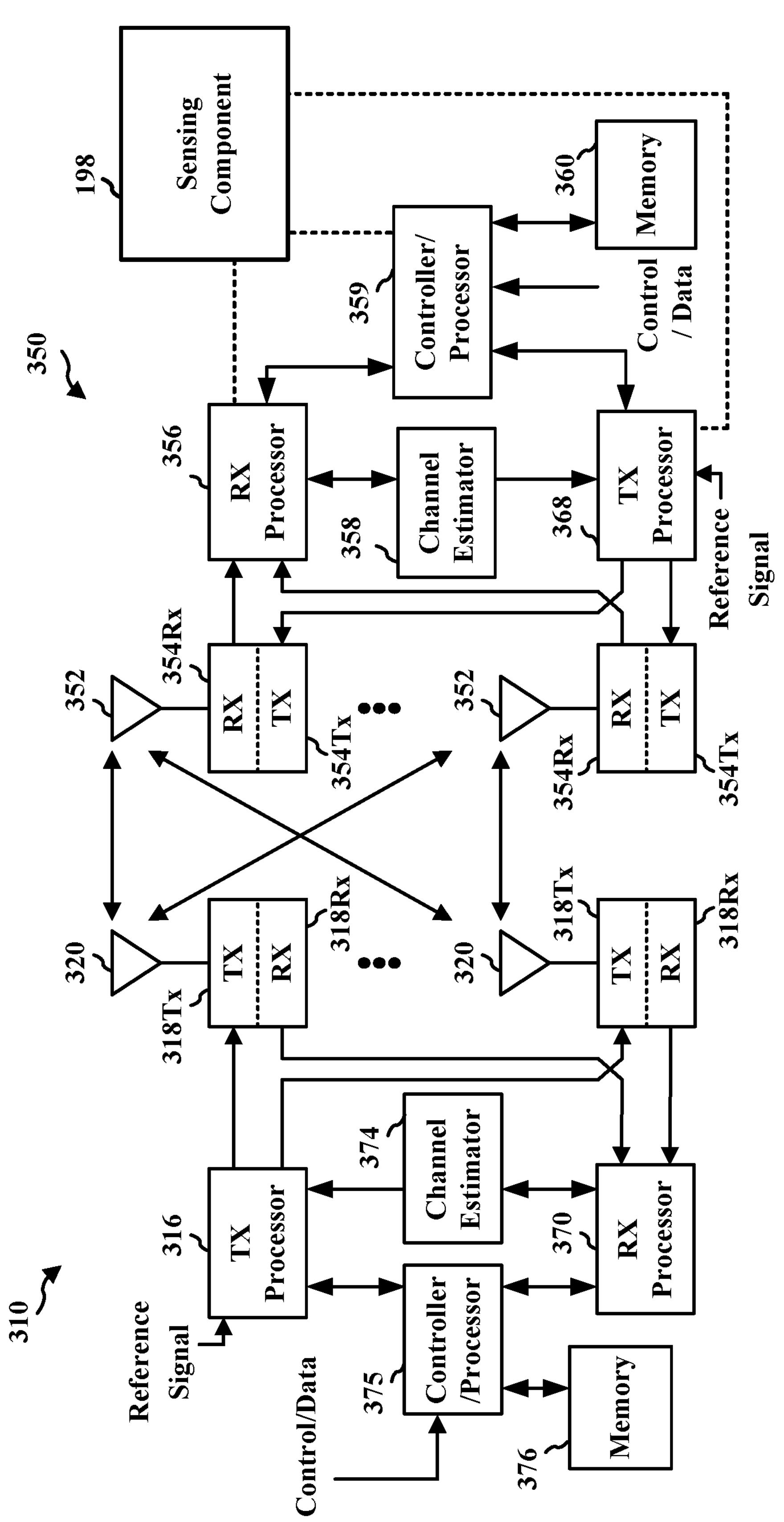
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer ofupper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the sensing component 198 of FIG. 1.

Figure 4:
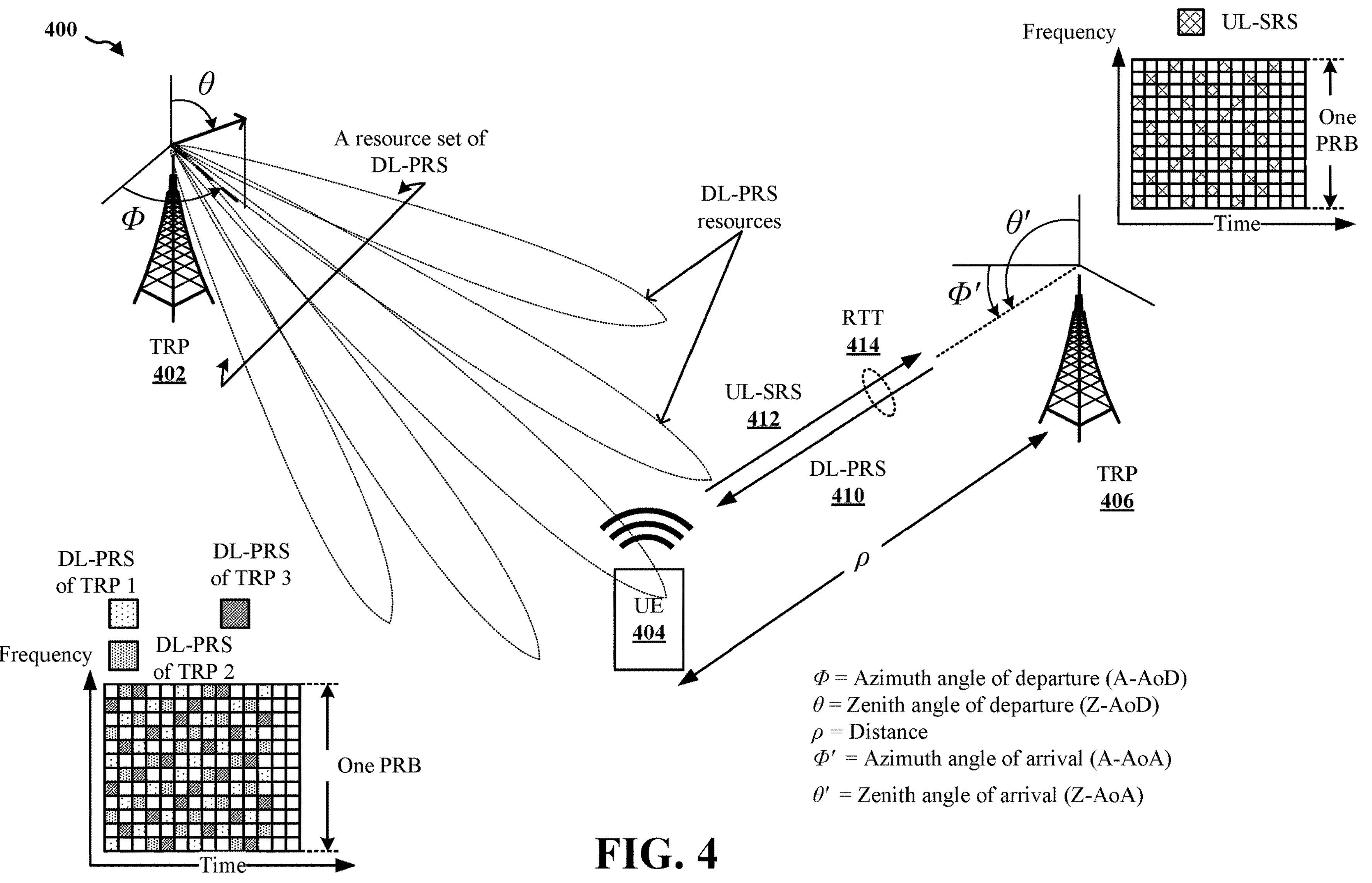
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS}$_RX. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In addition to network-based UE positioning technologies, a wireless device (e.g., a UE, an access point (AP), etc.) may also be configured to include sensing capabilities, where the wireless device may be able to sense (e.g., detect and/or track) one or more objects of an area or in an environment based on radio frequencies. An environment may refer to a particular geographical area or place, especially as affected by human activity, or the circumstances, objects, or conditions by which one is surrounded. For example, a wireless device may include a radar capability (which may be referred to as "RF sensing" and/or "cellular-based RF sensing), where the wireless device may transmit reference signals (e.g., radar reference signals (RRSs)) and measure the reference signals reflected from one or more objects (e.g., structures, walls, living objects, and/or things in an environment, etc.). Based on the measurement, the wireless device may determine or estimate a distance between the wireless device and the one or more objects and/or obtain environmental information associated with its surrounding. In another example, a first wireless device may receive signals transmitted from a second wireless device, where the first wireless device may determine or estimate a distance between the first wireless device and the second wireless device based on the received signals. For example, a tracking device (e.g., a Bluetooth tracker, an item tracker, an asset tracking device, etc.) may be configured to regularly transmit signals (e.g., beacon signals) or small amounts of data to a receiving device, such that the receiving device may be able to monitor the location or the relative distance of the tracking device. As such, a user may be able to track the location of an item (e.g., a car key, a wallet, a remote control, etc.) by attaching the tracking device to the item. For purposes of the present disclosure, a device/apparatus that is capable of performing sensing (e.g., transmitting and/or receiving signals for detecting at least one object or for estimating the distance between the device and the at least one object) may be referred to as a "sensing device" or a "sensing node." For example, a sensing device may be a UE, an AP device (e.g., a Wi-Fi router), a base station, a component of the base station, a TRP, a device capable of performing radar functions, etc. In addition, a device/apparatus that is capable of transmitting signals to a sensing device for the sensing device to determine the location or the relative distance of the device/apparatus may be referred to as a "tracking device," a "tracker," or a "tag."

Sensing sessions may be affected by clutter that serve as obstacles that affects the propagation of a signal from a base station or a sensing device. Clutter may include any obstacle that impedes a signal path. Examples of clutter include both natural or man-made features. Examples of natural features include, but are not limited to, trees, vegetation, canyons, mountains, etc. Examples of man-made features include, but are not limited to, buildings, houses, bridges, poles, etc.

Utilizing over-the-air (OTA) measurements, the clutter distribution across range and AoA may be determined for a particular environment. To aid RF sensing activity in a network, a network node (e.g., a gNB) may periodically update its clutter measurement. OTA measurement results have a strong correlation with the Tx beam pattern used to transmit signals from the network node. For example, the Tx beam width limits the observed clutters. For example, narrow beam widths do not observe (e.g., detect) clutter from wide angles, whereas wider beam widths observe clutter from a wider field of view. In addition, the Rx beamforming process may consider the Tx beamforming effect to have a fair comparison of clutter power across different AoAs. That is, if the Tx and Rx beams are aligned, the observations in the reflected power may be more accurate. However, if there is a mismatch in the Tx and Rx beams, then the Rx signal will have a lower power. However, in the bistatic RF sensing case (where the Tx and Rx are separated by a distance comparable to the expected target distance), the Rx may not be aware of the Tx beam information.

Figure 5:
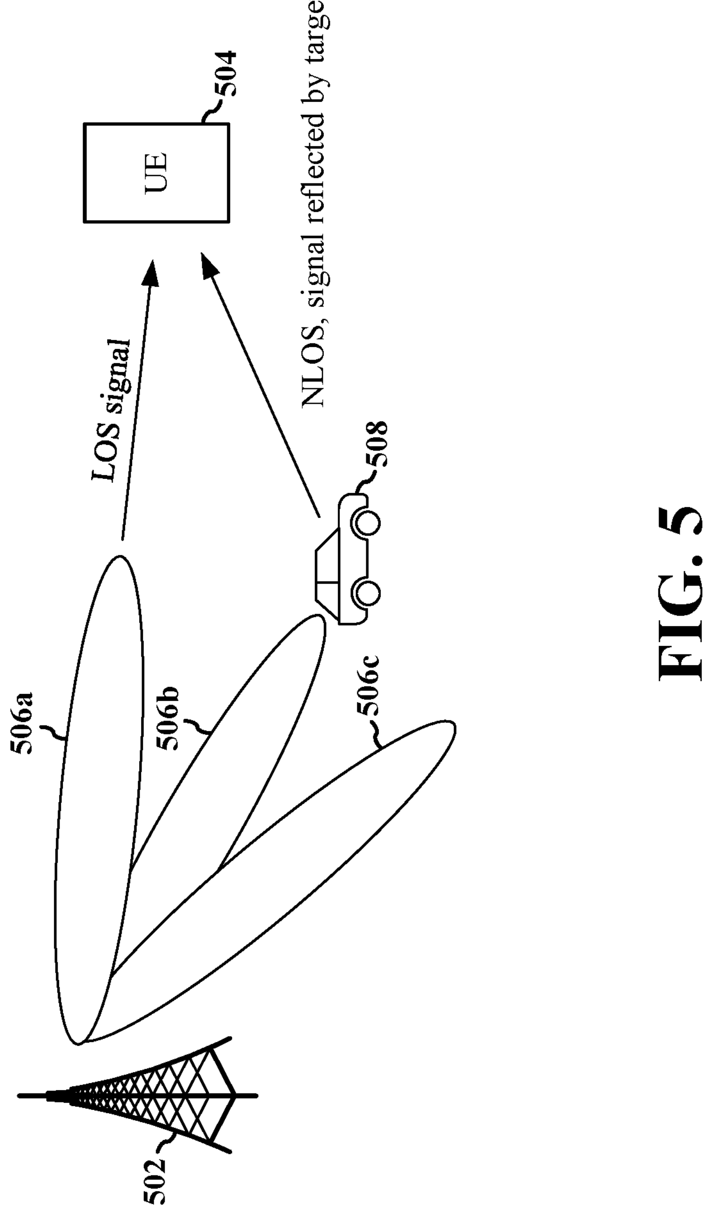
FIG. 5 illustrates a diagram for target angle-of-departure estimation.

As described above, the AoD of a signal may be utilized to estimate the location of a device, such as a UE. For example, FIG. 5 illustrates a diagram 500 for target AoD estimation. As shown in FIG. 5, a network node 502 may transmit one or more beams 506*a*, 506*b*, and/or 506*c*. As shown in FIG. 5, there is a direct path from the transmitter of network node 502 and the receiver of a UE 504. As such, the beam 506*a* is referred to as a line-of-sight (LOS) signal. The beam 506*b* is reflected by an obstacle (e.g., a vehicle 508), and the reflected beam is received by the UE 504. As such, the beam 506*b* is referred to as a non-line-of-sight (NLOS) signal.

For UE positioning, the AoD may be respective of the LOS signal (i.e., the beam 506*a*). That is, the AoD of the beam 506*a* may be utilized for UE positioning. For RF sensing, the AoD of the target (e.g., the vehicle 508) may be respective to a (e.g., one) NLOS signal that is reflected by the target. The AoD estimation could be either (i) a reference signal received power (RSRP)-based method (where the measured RSRP is compared with an RSRP database within some specific Tx beam pattern); or (ii) an Rx digital beam sweep-based method, where the UE sweeps through its set of beams for each Tx beam and finds the Tx beam with the highest received power (which is similar to UL-AoA estimation methods used for NR UE positioning). The Rx digital beam sweep-based method is expected to have better performance, but has a higher condition on the capability of the Rx antenna (i.e., the Rx antenna may need some array signal processing capability). The RSRP-based method may have less conditions on the capability of the Rx antenna, but may need more information regarding the Tx beam pattern.

Aspects of the present disclosure are directed to RF sensing that utilizes clutter information. In some examples, the SnMF 167 obtains clutter measurements from a plurality of network nodes. The SnMF 167 determines a clutter distribution of an environment for which the network nodes provide coverage based on the clutter measurements. The SnMF 167 provides the clutter distribution as assistance data to a sensing node.

For example, a network node (e.g., a gNB) may periodically report its clutter measurement to a sensing server (e.g., the SnMF 167). The type of clutter measurement may be by default static clutter measurements (e.g., zero or small-Doppler clutter measurements). For example, the network node may filter out certain clutter measurements, such as big-Doppler clutter information, as such clutter information is not as useful when performing RF sensing. However, it is noted that measurements for other types of clutter may be obtained by the network node and provided to the sensing server. The report may be based on the two-dimensional (2-D) range (e.g., distance, for example, in meters) and/or AoA measurement (e.g., the range, angle and/or power). The network node may indicate its antenna coordinates and/or orientation to the network (e.g., the sensing server) in the report, which may enable the network node to derive absolute clutter information. To reduce overhead, the clutter measurements that meet a threshold condition may be reported. For example, the clutter measurements having a power that meets or exceeds (or falls below) a threshold may be reported. The network node may report multiple clutter measurements based on multiple Tx beam patterns/Rx beam patterns. That is, for each Tx beam pattern and/or Rx beam pattern, the network node may obtain clutter measurements and report each of the clutter measurements obtained for a particular Tx beam pattern and/or Rx beam pattern. The network node may assign an identifier (ID) for each clutter measurement with a specific Tx beam/Rx beam. For example, for each set of clutter measurements obtained for a particular Tx beam pattern or Rx beam pattern, the network node may assign an identifier thereto to uniquely identify the set of clutter measurements. In some aspects, the network node may fuse (e.g., combine) multiple clutter measurements and signal the fused clutter measurements to the network. The network node may fuse multiple clutter measurements by combining the clutter measurements (e.g., by concatenating the measurements, sorting the measurements, grouping one or more measurements into respective groups, adding the measurements, organizing the measurements based on one or more statistical measures thereof, etc.).

The sensing server may collect clutter measurements across multiple network nodes. After collecting the clutter measurements across multiple network nodes, the sensing server may fuse a clutter distribution and signal the clutter distribution as assistance data for RS sensing and/or UE positioning. The assistance data may be indicative of the environment in which the UE is located (e.g., the assistance data may be indicative of characteristics, features, surroundings, etc., of the environment). To fuse a clutter distribution, the sensing server may combine (e.g., by concatenating the measurements, sorting the measurements, grouping one or more measurements into respective groups, adding the measurements, organizing the measurements based on one or more statistical measures thereof, etc.) the clutter measurements to generate a clutter distribution (e.g., based on range and AoA across all the network nodes from which the sensing server collects clutter measurements). For instance, the clutter distribution may indicate a normalized Rx power for different ranges and different AoAs.

To reduce overhead, the network node may report the clutter measurement (e.g., to the sensing server) in two steps. In the first step, the network node may report the absolute clutter measurements with long periodicity (e.g., hours or days). For example, the absolute clutter measurements may represent measurements for clutter that remains stationary for a relatively long period of time. In the second step, the network node may report differential clutter measurements with short periodicity (e.g., seconds or minutes). For example, the differential clutter measurements may represent measurements for clutter that remains stationary for a relatively short period of time (i.e., clutter that tends to move within an environment). As such, the differential clutter measurements may capture changes in the environment. In some aspects, different clutter measurement values below a particular threshold may be treated as zero. Such differential clutter measurement values may not be signaled to the network to reduce overhead. The particular threshold may be signaled to the network node by the network (e.g., the SnMF 167).

To reduce the overhead for signaling to the UE, if the UE is not new to the served area, the UE may receive the differential clutter measurements as the assistance data (and not receive the absolute clutter measurements). For example, the UE that enters a served area may initially receive the absolute clutter measurements. Over time, as the UE remains in the served area, the UE may periodically receive differential clutter measurements to determine the changes within the environment. The UE may not need to continuously receive the absolute clutter measurements, as such measurements would be repetitious due to the static nature of the clutter represented by the measurements. In some aspects, the UE may receive an indication from the network as to whether the clutter information received therefrom includes absolute clutter measurements or differential clutter measurements.

The assistance information provided to a UE may be utilized to aid target AoD estimation. For example, in some aspects, the Tx beam pattern may be shared to aid the target AoD estimation (e.g., by the network or a network node). When utilizing bistatic RF sensing (where the network node transmits beams and the UE receives the beams), AoD estimation at the UE side may be aided by the network node Tx beam pattern information. For the target AoD estimation, the receiver (e.g., a UE) may not be able to directly use the RSRP-based match method aided by the transmit beam pattern information because the target reflected signal is not an LOS signal (as shown in FIG. 5). However, with the Tx beam pattern information, the receiver may further enhance its digital Rx beamforming-based target AoD estimation. The Tx beam pattern information may include, but is not limited to, a boresight direction of the Tx beam (e.g., the axis of maximum gain (or radiated power) of the Tx antenna), a width of the Tx beam (e.g., the half-power beam width, which may be measured in decibels (dB) (e.g., 3 dBs)), etc. The foregoing may provide several enhancements for the receiver. For example, to achieve power savings, the receiver may select to measure which sensing reference signal (associated with a specific Tx beam). That is, the receiver may selectively measure certain sensing reference signals based on the Tx beam pattern. For instance, based on the pattern information, the UE may determine that certain Tx beams (and/or the sensing reference signals associated therewith) do not provide adequate coverage for a specific target AoD (e.g., if a Tx beam is very narrow and the target AoD is not within the field of view of that Tx beam). The receiver can skip performing measurements for such Tx beams, thereby saving power. In another example, the receiver may compensate the Tx beamforming loss across different angles to fine tune its array signal processing algorithm to enhance its AoD estimation accuracy.

In some aspects, the receiver may utilize beam-specific clutter information (e.g., received from the network or a network node). In some aspects, the beam-specific clutter information may aid the clutter rejection in the AoD estimation with a specific beam measurement. For example, the receiver may reject certain reference signal measurements associated with a particular Tx beam if the clutter information for that beam indicates that the reference signals are indicative of clutter. In addition, the clutter information may indicate the coverage for each transmit beam. If the receiver is interested in targets in a specific area, the receiver may need to measure a specific beam that covers that specific area. For example, the receiver may compare different sets of clutter information (each associated with a particular Tx beam) and determine which Tx beam provides the best coverage for a given area. The receiver may then measure the reference signals from that specific beam (and ignore the reference signals from the other Tx beams).

In some aspects, on-demand beamforming may be performed based on the clutter distribution. Strong clutter (e.g., environments having a large amount of clutter) is a challenging issue for cellular-based RF sensing. Even with some advanced clutter rejection algorithms, if the clutter power causes saturation, the target may still not be detected. To detect an object with a smaller radar cross section (RCS), the Tx (e.g., a network node) may have to transmit with higher power. For example, people standing or walking slowly may be hard to detect in an environment surrounded by high buildings.

When an operator deploys the RF sensing feature, the operator may identify which area(s) can guarantee good service quality. To rule out area(s) where it is challenging to have high quality RF sensing, non-RF sensing techniques may be leveraged (e.g., camera-based techniques, light detection and ranging (LIDAR)-based techniques), etc.). The network (e.g., the SnMF 167) may indicate the RF sensing serving quality of a specific area to a network node (which in turn provides the RF sensing serving quality to a UE) or directly to a receiver (e.g., a UE). If the RF sensing serving quality meets a threshold condition (e.g., falls below a threshold), the network node and/or UE may skip RF sensing activity in a corresponding area or with respect to specific beams utilized in the area. This may save the network node and/or the UE power by skipping the RF sensing activity in such areas.

Because the clutter distribution is the function of the Tx and/or Rx beam, the sensing server may identify relatively good and bad serving areas for RF sensing (i.e., based on the clutter distribution). That is, the sensing server may identify acceptable serving areas for RF sensing based on the clutter distribution. For example, the sensing server may analyze the clutter distribution to determine whether a particular area includes clutter that meets a threshold condition (e.g., whether there is a relatively large amount of clutter, e.g., based on the normalized Rx power of the reference signals). If the sensing server determines that the clutter meets the threshold condition, the sensing server may determine that the corresponding serving area is a bad (or unacceptable) serving area. Otherwise, the sensing server may determine that the corresponding serving area is a good (or acceptable) serving area.

In some aspects, the sensing server may on-demand request the network node or a sensing node to perform beamforming towards the good sensing area to enable high quality RF sensing. In some aspects, the sensing server may on-demand request multiple network nodes to utilize specific beams on demand to enhance the sensing quality of a specific area (e.g., a good sensing area). In addition, RCS diversity may be harvested. For example, if a sensing waveform is transmitted to the target from different directions, the waveform will be reflected at different angles. Each of the differently-reflected waveforms may be combined to harvest the RCS diversity of the target.

Figure 6:
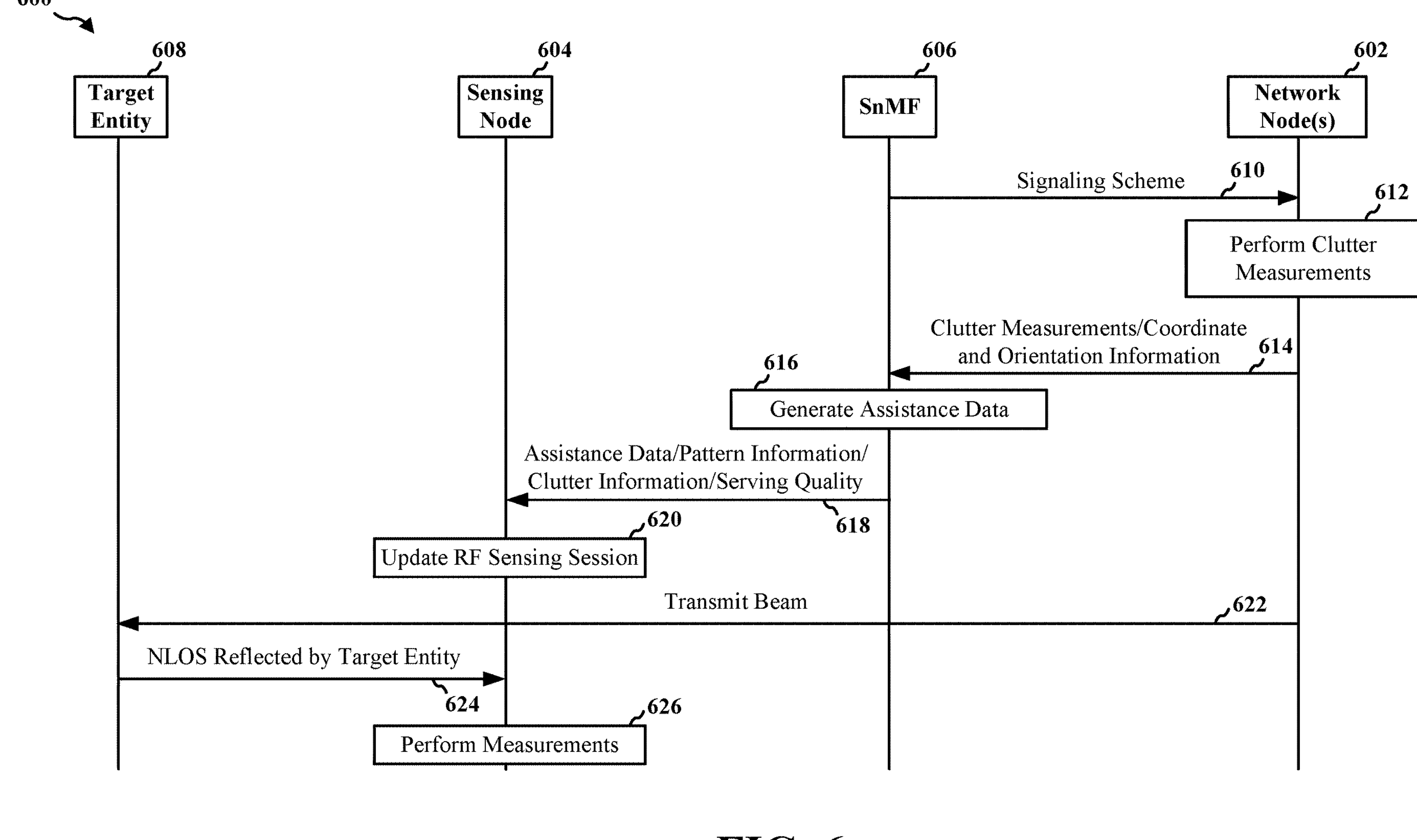
FIG. 6 is a call flow diagram illustrating a method of wireless communication in accordance with various aspects of this present disclosure.

FIG. 6 is a call flow diagram 600 illustrating a method of wireless communication in accordance with various aspects of this present disclosure. As shown in FIG. 6, the diagram 600 includes one or more network nodes 602, a sensing node 604, an SnMF 606, and a target entity 608. The network node(s) 602 may be an example of the base station 310, the TRP 402, the TRP 406 or the network node 502. Although aspects are described for the network node(s) 602, the aspects may be performed by a network node in aggregation and/or by one or more components of the network node(s) 602 (e.g., such as a CU 110, a DU 130, and/or an RU 140). Examples of the sensing node 604 include, but are not limited to, a UE (such as the UE 350, the UE 404, or the UE 504), an AP device (e.g., a Wi-Fi router), a base station, a component of the base station, a TRP, a device capable of performing radar functions, etc. Examples of the target entity 608 include, but are not limited to, a vehicle, a UE, a person, any object (either stationary or mobile) by which an RF signal may be reflected, etc. The SnMF 606 may be an example of the SnMF 167. As shown in FIG. 6, at 610, the SnMF 606 may provide, to the network node(s) 602, an indication of a signaling scheme for providing a set of clutter measurements. The signaling scheme may indicate a type or format in which the set of clutter measurements are to be formatted, a periodicity by which the set of clutter measurements are to be provided, etc.

At 612, each of the network node(s) 602 may perform clutter measurements for a respective environment. For example, the network node(s) 602 may perform OTA measurements in the environment to determine a clutter distribution across range and AoA. For example, the network node(s) 602 may perform OTA measurements based on the 2-D range (e.g., distance, for example in meters) and/or AoA measurements (e.g., the range, angle and/or power). In some aspects, the network node(s) 602 may obtain static clutter measurements (e.g., zero or small-Doppler clutter measurements). For example, the network node may filter out certain clutter measurements, such as big-Doppler clutter information, as such clutter information is not as useful when performing RF sensing. However, it is noted that measurements for other types of clutter may be obtained by the network node and provided to the sensing server.

At 614, the network node(s) 602 may provide the clutter measurements to the SnMF 606 based on the signaling scheme. In some aspects, each network node of the network node(s) 602, at 614, may also provide information indicative of the coordinates of the one or more antennas of the network node(s) 602 and/or the orientation of the antenna(s). In some aspects, the network node(s) 602 may report clutter measurements having a power above a particular threshold. The threshold may be signaled to the network node(s) 602 by the SnMF 606. Alternatively, the threshold may be determined and set by the network node(s) 602.

In some aspects, each network node of the network node(s) 602, at 612, may also, for each Tx beam pattern and/or Rx beam pattern associated with the network node, obtain clutter measurements and report each of the clutter measurements obtained for a particular Tx beam pattern and/or Rx beam pattern to the SnMF 606. The network node(s) 602 may assign an identifier (ID) for each clutter measurement with a specific Tx beam/Rx beam. For example, for each set of clutter measurements obtained for a particular Tx beam pattern or Rx beam pattern, the network node(s) 602 may assign an identifier thereto to uniquely identify the set of clutter measurements. In some aspects, the network node(s) 602 may fuse (e.g., combine) multiple clutter measurements and signal the fused clutter measurements to the SnMF 606. The network node(s) 602 may fuse multiple clutter measurements by combining the clutter measurements (e.g., by concatenating the measurements, sorting the measurements, grouping one or more measurements into respective groups, adding the measurements, organizing the measurements based on one or more statistical measures thereof, etc.).

In some aspects, the network node(s) 602 may provide the clutter measurements in two steps. For example, in the first step, the network node(s) 602 may provide a first subset of the set of clutter measurements, the first subset including a set of absolute clutter measurements of the set of clutter measurements, where the set of absolute clutter measurements has a first periodicity (e.g., a relatively long periodicity, such as hours or days). In the second step, the network node(s) 602 may provide a second subset of the set of clutter measurements, the second subset including a set of differential clutter measurements of the set of clutter measurements, where the set of differential clutter measurements has a second periodicity that is relatively shorter than the first periodicity (e.g., seconds or minutes).

In some aspects, the SnMF 606 may provide a threshold for the set of differential clutter measurements by which the network node(s) 602 determine which of the set of differential clutter measurements are to be provided to the SnMF 606. For example, differential clutter measurement values below the threshold may be treated as zero. Such differential clutter measurement values may not be signaled to the SnMF 606 to reduce overhead.

At 616, the SnMF 606 may generate assistance data based on the set of clutter measurements. The assistance data may include a clutter distribution that is indicative of the environment in which the UE is located (e.g., the assistance data may be indicative of characteristics, features, surroundings, etc., of the environment). To fuse the clutter measurements, the SnMF 606 may combine (e.g., by concatenating the measurements, sorting the measurements, grouping one or more measurements into respective groups, adding the measurements, organizing the measurements based on one or more statistical measures thereof, etc.) the clutter measurements to generate a clutter distribution (e.g., based on range and AoA across all the network node(s) 602 from which the SnMF 606 collects clutter measurements). For instance, the clutter distribution may indicate a normalized Rx power for different ranges and different AoAs.

At 618, the SnMF 606 may provide the assistance data to the sensing node 604. In some aspects, the assistance data may include a set of differential clutter measurements (and not the absolute clutter measurements). For example, if the sensing node 604 is not new to a served area, the SnMF 606 may provide the differential clutter measurements as the assistance data (and not provide the absolute clutter measurements). In some aspects, the SnMF 606 may provide an indication to the sensing node 604 that the clutter information (e.g., included in the assistance data) includes one of a set of absolute clutter measurements and/or a set of differential clutter measurements.

In some aspects, at 618, the SnMF 606 may provide pattern information for at least one transmit beam of at least one network node of the plurality of network nodes. In some aspects, the pattern information may include at least one of a boresight direction of the at least one transmit beam or a width of the at least one transmit beam. In some aspects, at 618, the SnMF 606 may provide, based on the pattern information, a request to the sensing node 604 to utilize one or more particular beams in a plurality of beams (e.g., the transmit beams of the network node(s) 602) for an RF sensing session.

In some aspects, at 618, the SnMF 606 may provide, to the sensing node 604, clutter information (e.g., as part of the assistance data) for at least one transmit beam of at least one network node of the network node(s) 602. In some aspects, the clutter information may indicate a coverage area of the at least one transmit beam.

In some aspects, at 618, the SnMF 606 may indicate, to the sensing node 604, an RF sensing serving quality of a particular sensing area associated with the network node(s) 602 based on the set of cluster measurements.

In some aspects, at 618, the SnMF 606 may provide, based on the pattern information for at least one transmit beam of one of the network node(s) 602, a request to beamform towards a particular sensing area associated with the network node(s) 602, where the particular sensing area is associated with an RF sensing serving quality that meets or exceeds a threshold condition.

At 620, the sensing node 604 may update an RF sensing session based on the assistance data. For instance, prior to receiving the assistance data, the sensing node 604 may perform an RF sensing session. The sensing node 604 may update the RF sensing session based on the assistance data.

For instance, at 626, the sensing node 604 may perform a set of measurements based on the updated RF sensing session. For example, in some aspects at 622, the network node(s) 602 may provide a transmit beam in the direction of the target entity 608. The transmit beam may be reflected off of the target entity 608, and, at 624, the reflected signal may be received as an NLOS signal. The sensing node 604 may perform a set of measurements based on the NLOS signal at 626. For instance, the sensing node 604 may estimate an AoD of the NLOS signal based at least on the pattern information for the transmit beam and/or the clutter information received at 618.

In some aspects, at 626, the sensing node 604 may selectively perform at least one measurement of a sensing reference signal (e.g., the DL-PRS 410) associated with the at least one transmit beam based on the pattern information.

In some aspects, at 626, the sensing node 604 may perform the set of measurements for a respective area of the one or more areas having a respective RF sensing serving quality of the one or more RF sensing serving qualities (as indicated at 618) that meets or exceeds a threshold condition.

FIG. 7 is a flowchart 700 illustrating methods of wireless communication at a UE in accordance with various aspects of the present disclosure. The UE may be the UE 104, 350, 404, 504, the sensing node 604, or the apparatus 904 in the hardware implementation of FIG. 9.

At 702, the UE may obtain assistance data based on a set of clutter measurements associated with a plurality of network nodes. For example, referring to FIG. 6, the sensing node 604, at 618, may obtain assistance data based on a set of clutter measurements associated with the network node(s) 602. In an aspect, 702 may be performed by the sensing component 198.

In some aspects, the UE may obtain the assistance data by receiving, from a network entity, the assistance data based on the set of clutter measurements. For example, referring to FIG. 6, the sensing node 604, at 618, may receive, from the SnMF 606, the assistance data based on the set of clutter measurements.

In some aspects, the assistance data includes a set of differential clutter measurements. For example, referring to FIG. 6, the assistance data obtained at 618 may include a set of differential clutter measurements.

At 704, the UE may update an RF sensing session based on the assistance data. For example, referring to FIG. 6, the sensing node 604, at 620, may update an RF sensing session based on the assistance data obtained at 618. In an aspect, 704 may be performed by the sensing component 198.

At 706, the UE may perform a set of measurements based on the updated RF sensing session. For example, referring to FIG. 6, the sensing node 604, at 626, may perform a set of measurements based on the updated RF sensing session. In an aspect, 706 may be performed by the sensing component 198.

In some aspects, the UE may receive pattern information for at least one transmit beam of a network node, receive an NLOS signal reflected by a target entity, and estimate an AOD of the NLOS signal based at least on the pattern information for the at least one transmit beam. For example, referring to FIG. 6, the sensing node 604 may, at 618, receive pattern information from the SnMF 606 for at least one transmit beam of a network node of the network node(s) 602. At 624, the sensing node 604 may receive an NLOS signal reflected by the target entity 608. At 626, the sensing node 604 may estimate an AOD of the NLOS signal based at least on the pattern information for the at least one transmit beam.

In some aspects, the pattern information includes at least one of a boresight direction of the at least one transmit beam or a width of the at least one transmit beam. For example, referring to FIG. 6, the pattern information received at 618 may include at least one of a boresight direction of the at least one transmit beam or a width of the at least one transmit beam.

In some aspects, the UE may perform the set of measurements based on the updated RF sensing session by selectively performing at least one measurement of a sensing reference signal associated with the at least one transmit beam based on the pattern information. For example, referring to FIG. 6, the sensing node 604, at 626, may perform the set of measurements based on the updated RF sensing session by selectively performing at least one measurement of a sensing reference signal associated with the at least one transmit beam of a network node of network node(s) 602 based on the pattern information received at 618.

In some aspects, the UE may receive clutter information for the at least one transmit beam of the network node and may estimate the AoD of the NLOS signal by estimating the AoD of the NLOS signal based on the pattern information of the at least one transmit beam and the clutter information. For example, referring to FIG. 6, the sensing node 604, at 618, may receive clutter information for the at least one transmit beam of the network node of the network node(s) 602. At 626, the sensing node 604 may estimate the AoD of the NLOS signal based on the pattern information (received at 618) of the at least one transmit beam of the network node of the network node(s) 602 and the clutter information (received at 618).

In some aspects, the clutter information may indicate a coverage area of the at least one transmit beam. For example, referring to FIG. 6, the clutter information received at 618 may indicate a coverage area of the at least one transmit beam.

In some aspects, the UE may receive an indication that the clutter information includes one of a set of absolute clutter measurements or a set of differential clutter measurements. For example, referring to FIG. 6, the sensing node 604, at 618, may receive an indication that the clutter information includes one of a set of absolute clutter measurements or a set of differential clutter measurements.

In some aspects, the UE may receive RF sensing serving quality(ies) for area(s) associated with the plurality of network nodes. The UE may perform the set of measurements for a respective area of the area(s) having a respective RF sensing serving quality of the RF sensing serving quality(ies) that meets or exceeds a threshold condition. For example, referring to FIG. 6, the sensing node 604, at 618, may receive (e.g., as part of the assistance data) RF sensing serving quality(ies) for area(s) associated with the network node(s) 602. At 626, the sensing node 604 may perform the set of measurements for a respective area of the area(s) having a respective RF sensing serving quality of the RF sensing serving quality(ies) that meets or exceeds a threshold condition.

FIG. 8 is a flowchart 800 illustrating methods of wireless communication at a network entity in accordance with various aspects of the present disclosure. In some aspects, the network entity may be an SnMF (e.g., the SnMF 167, the SnMF 606, or the network entity 1160 in the hardware implementation of FIG. 11).

At 802, the network entity may provide a first indication of a signaling scheme for a set of clutter measurements associated with a plurality of network nodes. For example, referring to FIG. 6, the SnMF 606, at 610, may provide a first indication of a signaling scheme for a set of clutter measurements associated with the network node(s) 602. In an aspect, 802 may be performed by the assistance data generator component 199.

At 804, the network entity may receive, based on the signaling scheme, a second indication of the set of the clutter measurements from the plurality of network nodes. For example, referring to FIG. 6, the SnMF 606, at 614, may receive, based on the signaling scheme, a second indication of the set of the clutter measurements from the network node(s) 602. In an aspect, 804 may be performed by the assistance data generator component 199.

In some aspects, the network entity may receive the second indication of the set of clutter measurements from the plurality of network nodes by receiving a first subset including a set of absolute clutter measurements of the set of clutter measurements, where the set of absolute clutter measurements has a first periodicity, and by receiving a second subset of the set of clutter measurements, the second subset including a set of differential clutter measurements of the set of clutter measurements, where the set of differential clutter measurements has a second periodicity that is shorter than the first periodicity. For example, referring to FIG. 6, the SnMF 606, at 614, may receive a first subset including a set of absolute clutter measurements of the set of clutter measurements, where the set of absolute clutter measurements has a first periodicity, and receive a second subset of the set of clutter measurements, the second subset including a set of differential clutter measurements of the set of clutter measurements, where the set of differential clutter measurements has a second periodicity that is shorter than the first periodicity.

In some aspects, the network entity may provide a threshold for the set of differential clutter measurements by which each of the plurality of network nodes determines which of the set of differential clutter measurements are to be provided. For example, referring to FIG. 6, the SnMF 606, at 610, provide a threshold for the set of differential clutter measurements by which the network node(s) 602 determine which of the set of differential clutter measurements are to be provided.

In some aspects, the network entity may receive antenna coordinate and orientation information from the plurality of network nodes. For example, referring to FIG. 6, the SnMF 606, at 614, may receive, from the network node(s) 602, antenna coordinate and orientation information of antenna(s) of the network node(s) 602.

At 806, the network entity may provide, for a UE, assistance data based on the set of clutter measurements. For example, referring to FIG. 6, at 618, the SnMF 606, may provide, for the sensing node 604, assistance data based on the set of clutter measurements. In an aspect, 806 may be performed by the assistance data generator component 199.

In some aspects, the assistance data includes a clutter distribution that is based on the set of clutter measurements. For example, referring to FIG. 6, the assistance data provided at 618 may include a clutter distribution that is based on the set of clutter measurements.

In some aspects, the assistance data includes a set of differential clutter measurements. For example, referring to FIG. 6, the assistance data provided at 618 may include a set of differential clutter measurements.

In some aspects, the network entity may indicate, based on the set of clutter measurements, an RF sensing serving quality of a particular sensing area associated with the plurality of network nodes. For example, referring to FIG. 6, the SnMF 606, may indicate, based on the set of clutter measurements, an RF sensing serving quality of a particular sensing area associated with the network node(s) 602.

In some aspects, the network entity may provide, for the UE, pattern information for at least one transmit beam of at least one network node of the plurality of network nodes. For example, referring to FIG. 6, the SnMF 606, at 618, may provide, for the sensing node 604, pattern information for at least one transmit beam of at least one network node of the network node(s) 602.

In some aspects, the pattern information includes at least one of a boresight direction of the at least one transmit beam or a width of the at least one transmit beam. For example, referring to FIG. 8, the pattern information provided at 618 may include at least one of a boresight direction of the at least one transmit beam or a width of the at least one transmit beam.

In some aspects, the network entity may provide, based on pattern information for at least one transmit beam of one of the plurality of network nodes, a request to beamform towards a particular sensing area associated with the plurality of network nodes, where the particular sensing area is associated with an RF sensing serving quality that meets or exceeds a threshold condition. For example, referring to FIG. 6, the SnMF 606, at 618, may provide, based on pattern information for at least one transmit beam of one of the network node(s) 602, a request to the sensing node 604 to beamform towards a particular sensing area associated with the network node(s) 602, where the particular sensing area is associated with an RF sensing serving quality that meets or exceeds a threshold condition.

In some aspects, the network entity may provide, based on pattern information for at least one transmit beam of one of the plurality of network nodes, a request to utilize one or more particular beams in a plurality of beams for an RF sensing session. For example, referring to FIG. 8, the SnMF 606 may, at 618, provide, based on pattern information for at least one transmit beam of one of the network node(s) 602, a request to the sensing node 604 to utilize one or more particular beams in a plurality of beams for an RF sensing session.

In some aspects, the network entity may provide, for the UE, clutter information for at least one transmit beam of at least one network node of the plurality of network nodes. For example, referring to FIG. 6, the SnMF 606 may, at 618, provide, for the sensing node 604, clutter information for at least one transmit beam of at least one network node of the network node(s) 602.

In some aspects, the clutter information may indicate a coverage area of the at least one transmit beam. For example, referring to FIG. 6, the clutter information provided at 618 may indicate a coverage area of the at least one transmit beam of the network node of the network node(s) 602.

In some aspects, the network entity may provide, for the UE, an indication that the clutter information includes one of a set of absolute clutter measurements or a set of differential clutter measurements. For example, referring to FIG. 6, the SnMF 606, at 618, may provide, for the sensing node 604, an indication that the clutter information includes one of a set of absolute clutter measurements or a set of differential clutter measurements.

Figure 9:
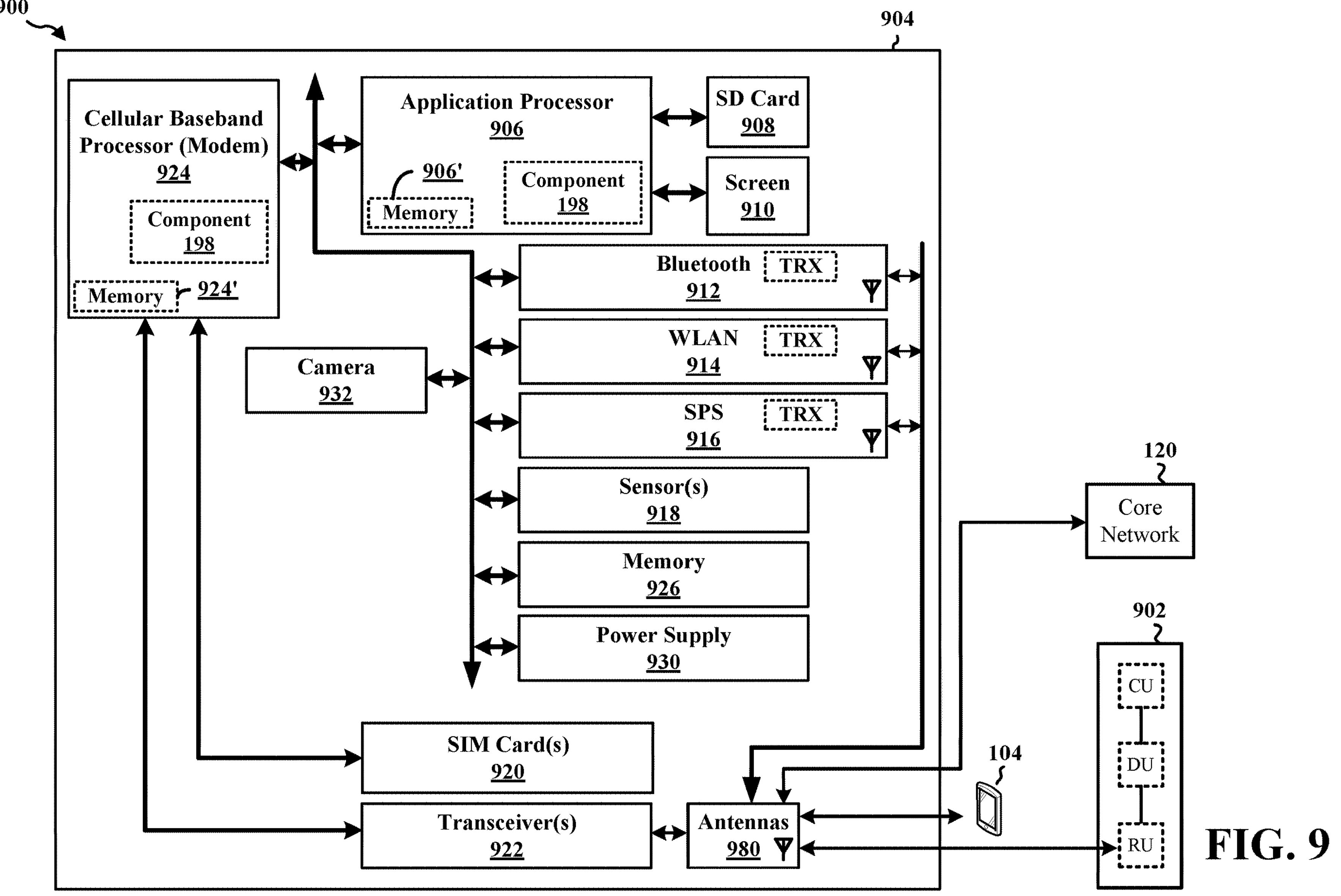
FIG. 9 is a diagram illustrating an example of a hardware implementation for an example apparatus and/or network entity.

FIG. 9 is a diagram 900 illustrating an example of a hardware implementation for an apparatus 904. The apparatus 904 may be a UE, a component of a UE, or may implement UE functionality. In some aspects, the apparatus 904 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 904 may further include one or more subscriber identity modules (SIM) cards 920 and an application processor 906 coupled to a secure digital (SD) card 908 and a screen 910. The application processor 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104, the core network 120, and/or with an RU associated with a network entity 902. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application) and include just the cellular baseband processor 924 and/or the application processor 906, and in another configuration, the apparatus 904 may be the entire UE (e.g., see UE 350 of FIG. 3) and include the additional modules of the apparatus 904.

As discussed supra, the component 198 may be configured to obtain assistance data based on a set of clutter measurements associated with a plurality of network nodes, update a radio frequency (RF) sensing session based on the assistance data, and perform a set of measurements based on the updated RF sensing session. The component 198 may be configured to perform any of the aspects described in connection with the flowchart in FIG. 7 and/or the aspects performed by the sensing node 604 in the communication flow in FIG. 6. The component 198 may be within the cellular baseband processor 924, the application processor 906, or both the cellular baseband processor 924 and the application processor 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 904 may include a variety of components configured for various functions. In one configuration, the apparatus 904, and in particular the cellular baseband processor 924 and/or the application processor 906, may include means for obtaining assistance data based on a set of clutter measurements associated with a plurality of network nodes, means for updating a radio frequency (RF) sensing session based on the assistance data, and means for performing a set of measurements based on the updated RF sensing session. The means may be the component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 10:
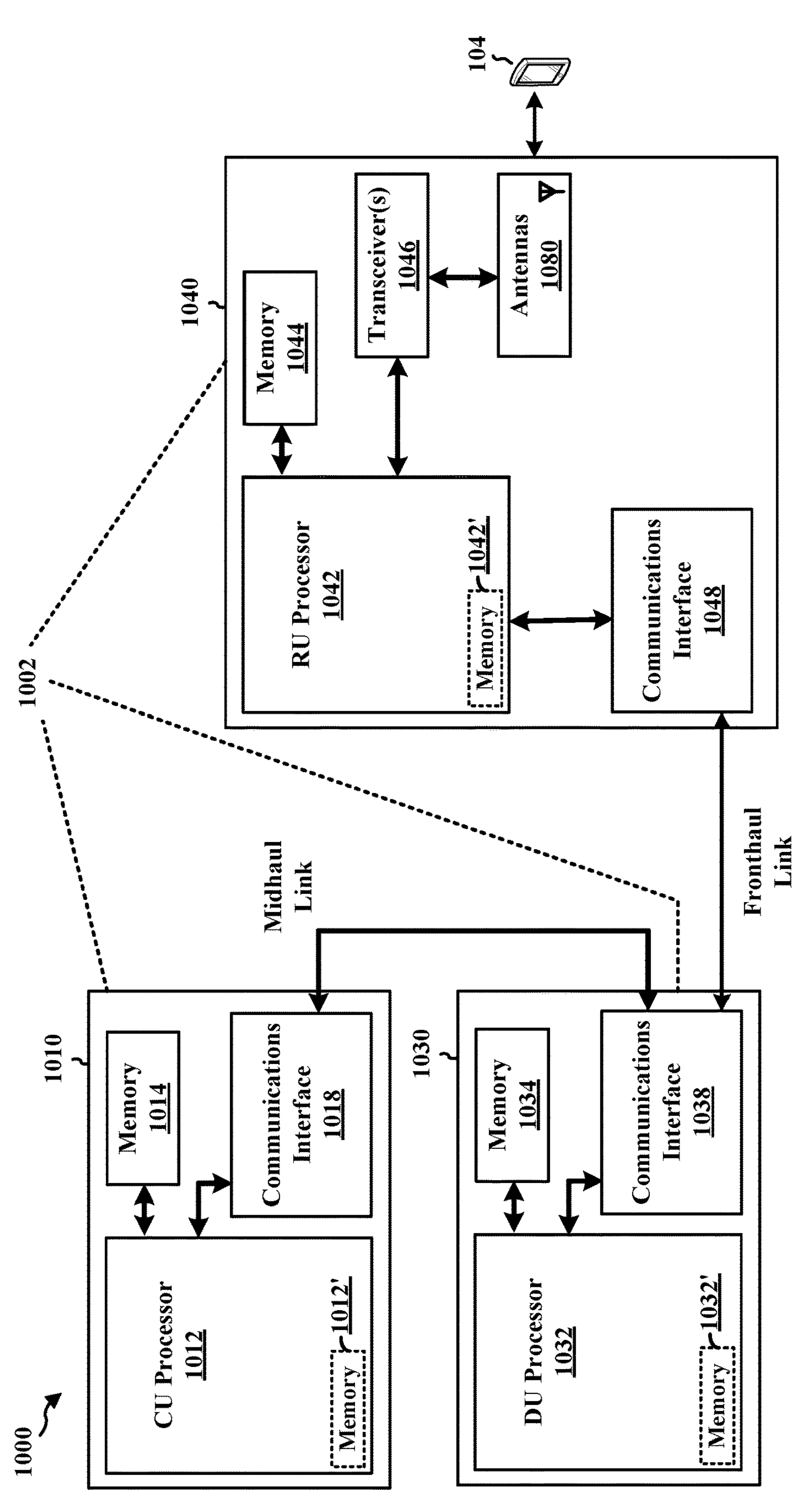
FIG. 10 is a diagram illustrating an example of a hardware implementation for an example network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include a CU processor 1012. The CU processor 1012 may include on-chip memory 1012'. In some aspects, the CU 1010 may further include additional memory modules 1014 and a communications interface 1018. The CU 1010 communicates with the DU 1030 through a midhaul link, such as an F1 interface. The DU 1030 may include a DU processor 1032. The DU processor 1032 may include on-chip memory 1032'. In some aspects, the DU 1030 may further include additional memory modules 1034 and a communications interface 1038. The DU 1030 communicates with the RU 1040 through a fronthaul link. The RU 1040 may include an RU processor 1042. The RU processor 1042 may include on-chip memory 1042'. In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

Figure 11:
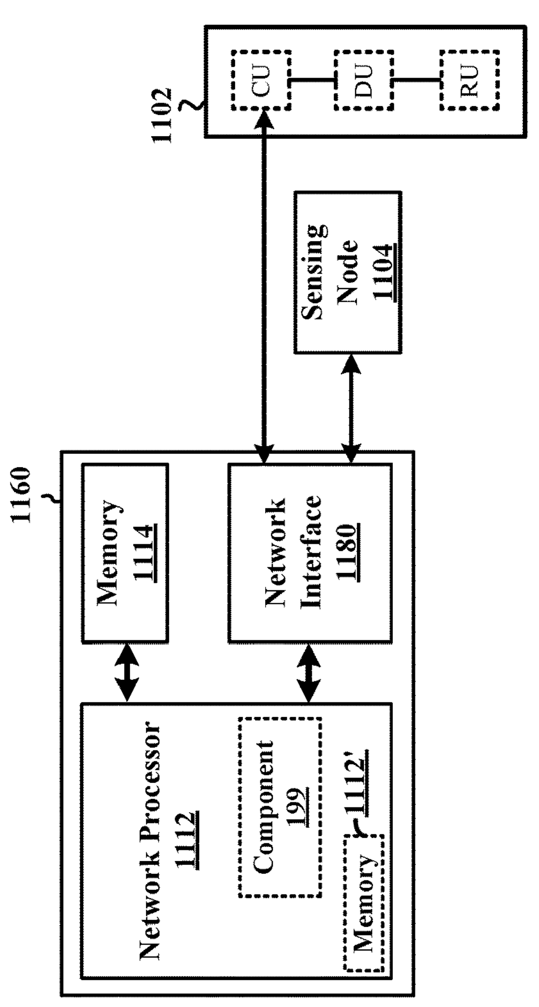
FIG. 11 is a diagram illustrating an example of a hardware implementation for an example network entity.

FIG. 11 is a diagram 1100 illustrating an example of a hardware implementation for a network entity 1160. In one example, the network entity 1160 may be within the core network 120. The network entity 1160 may include a network processor 1112. The network processor 1112 may include on-chip memory 1112'. In some aspects, the network entity 1160 may further include additional memory modules 1114. The network entity 1160 communicates via the network interface 1180 directly (e.g., backhaul link) or indirectly (e.g., through a RIC) with the CU 1102 and the sensing node 1104, which is an example of the sensing node 604. The on-chip memory 1112' and the additional memory modules 1114 may each be considered a computer-readable medium/memory. Each computer-readable medium/memory may be non-transitory. The processor 1112 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured provide a first indication of a signaling scheme for a set of clutter measurements associated with a plurality of network nodes, receive, based on the signaling scheme, a second indication of the set of the clutter measurements from the plurality of network nodes, and provide, for a UE, assistance data based on the set of clutter measurements. The component 199 may be configured to perform any of the aspects described in connection with the flowchart in FIG. 8 and/or the aspects performed by the SnMF 606 in the communication flow in FIG. 6. The component 199 may be within the processor 1112. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1160 may include a variety of components configured for various functions. In one configuration, the network entity 1160 may include means for providing a first indication of a signaling scheme for a set of clutter measurements associated with a plurality of network nodes, means for receiving, based on the signaling scheme, a second indication of the set of the clutter measurements from the plurality of network nodes, and means for providing, for a UE, assistance data based on the set of clutter measurements. The means may be the component 199 of the network entity 1160 configured to perform the functions recited by the means.

Various aspects relate generally to positioning systems. Some aspects more specifically relate to RF sensing that utilizes clutter information. In some examples, a sensing management function (SnMF) of a cellular network obtains clutter measurements from a plurality of network nodes. The SnMF determines a clutter distribution of an environment for which the network nodes provide coverage based on the clutter measurements. The SnMF provides the clutter distribution as assistance data to a sensing node. The sensing node performs an RF sensing session based on the assistance data. In addition to including the clutter distribution, the assistance data may also include transmit beam patterns of the network nodes, transmit beam-specific clutter information, and serving qualities of sensing areas.

Particular aspects of the subject matter described in this disclosure can be implemented to realize one or more of the following potential advantages. In some examples, by utilizing the assistance data to perform an RF sensing session, the described techniques enable the sensing node to more accurately detect and track a target entity as it navigates through its environment including the clutter. In addition, by utilizing the transmit beam patterns, the sensing node may determine which transmit beams provide adequate coverage for a certain target angle-of-departure (AoD) and utilize such transmit beams during a sensing session. By selectively utilizing such transmit beams (rather than all transmit beams), the sensing node is able to conserve power. Moreover, by utilizing the transmit beam patterns, the sensing node may compensate transmit beamforming loss across different angles to fine tune its array signal processing algorithm to enhance its AoD estimation accuracy. By utilizing the transmit beam-specific clutter information, the sensing node may reject certain reference signal measurements associated with a particular transmit beam if the clutter information for that beam indicates that the reference signals are indicative of clutter. This aids the sensing node to reject clutter, thereby improving its AoD estimation accuracy. By utilizing the serving qualities of sensing areas, the sensing node may bypass RF sensing activity for areas having a relatively low serving quality, thereby enabling the sensing node to conserve power.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: obtaining assistance data based on a set of clutter measurements associated with a plurality of network nodes; updating a radio frequency (RF) sensing session based on the assistance data; and performing a set of measurements based on the updated RF sensing session.

Aspect 2 is the method of aspect 1, further including receiving pattern information for at least one transmit beam of a network node; receiving an NLOS signal reflected by a target entity; and estimating an AoD of the NLOS signal based at least on the pattern information for the at least one transmit beam.

Aspect 3 is the method of aspect 2, where the pattern information includes at least one of: a boresight direction of the at least one transmit beam; or a width of the at least one transmit beam.

Aspect 4 is the method of any of aspects 2 and 3, where performing the set of measurements based on the updated RF sensing session includes: selectively performing at least one measurement of a sensing reference signal associated with the at least one transmit beam based on the pattern information Aspect 5 is the method of any of aspects 2 to 4, further including: receiving clutter information for the at least one transmit beam of the network node; and where estimating the AoD of the NLOS signal includes: estimating the AoD of the NLOS signal based on the pattern information of the at least one transmit beam and the clutter information Aspect 6 is the method of aspect 5, where the clutter information indicates a coverage area of the at least one transmit beam.

Aspect 7 is the method of any of aspects 5 and 6, further including: receiving an indication that the clutter information includes one of a set of absolute clutter measurements or a set of differential clutter measurements.

Aspect 8 is the method of any of aspects 1 to 7, where the assistance data includes a set of differential clutter measurements.

Aspect 9 is the method of any of aspects 1 to 8, further including: receiving one or more RF sensing serving qualities for one or more areas associated with the plurality of network nodes, where performing the set of measurements based on the updated RF sensing session includes: performing the set of measurements for a respective area of the one or more areas having a respective RF sensing serving quality of the one or more RF sensing serving qualities that meets or exceeds a threshold condition.

Aspect 10 is the method of any of aspects 1 to 9, where obtaining the assistance data based on the set of clutter measurements includes: receiving, from a network entity, the assistance data based on the set of clutter measurements.

Aspect 11 is a method of wireless communication at a network entity, including: providing a first indication of a signaling scheme for a set of clutter measurements associated with a plurality of network nodes; receiving, based on the signaling scheme, a second indication of the set of the clutter measurements from the plurality of network nodes; and providing, for a UE, assistance data based on the set of clutter measurements.

Aspect 12 is a method of aspect 11, where the assistance data includes a clutter distribution that is based on the set of clutter measurements.

Aspect 13 is a method of any of aspects 11 and 12, where receiving the second indication of the set of clutter measurements from the plurality of network nodes includes: receiving a first subset of the set of clutter measurements, the first subset including a set of absolute clutter measurements of the set of clutter measurements, where the set of absolute clutter measurements has a first periodicity; and receiving a second subset of the set of clutter measurements, the second subset including a set of differential clutter measurements of the set of clutter measurements, where the set of differential clutter measurements has a second periodicity that is shorter than the first periodicity.

Aspect 14 is a method of aspect 13, further including: providing a threshold for the set of differential clutter measurements by which each of the plurality of network nodes determines which of the set of differential clutter measurements are to be provided.

Aspect 15 is a method of any of aspects 11 to 14, further including: receiving antenna coordinate and orientation information from the plurality of network nodes.

Aspect 16 is a method of any of aspects 11 to 15, further including: indicating, based on the set of clutter measurements, an RF sensing serving quality of a particular sensing area associated with the plurality of network nodes.

Aspect 17 is a method of any of aspects 11 to 16, further including: providing, based on pattern information for at least one transmit beam of one of the plurality of network nodes, a request to beamform towards a particular sensing area associated with the plurality of network nodes, where the particular sensing area is associated with an RF sensing serving quality that meets or exceeds a threshold condition.

Aspect 18 is a method of any of aspects 11 to 17, further including: providing, based on pattern information for at least one transmit beam of one of the plurality of network nodes, a request to utilize one or more particular beams in a plurality of beams for an RF sensing session.

Aspect 19 is a method of any of aspects 11 to 18, where the assistance data includes a set of differential clutter measurements.

Aspect 20 is a method of any of aspects 11 to 19, further including: providing, for the UE, pattern information for at least one transmit beam of at least one network node of the plurality of network nodes.

Aspect 21 is a method of aspect 20, where the pattern information includes at least one of: a boresight direction of the at least one transmit beam; or a width of the at least one transmit beam.

Aspect 22 is a method of any of aspects 11 to 21, further including: providing, for the UE, clutter information for at least one transmit beam of at least one network node of the plurality of network nodes.

Aspect 23 is a method of aspect 22, where the clutter information indicates a coverage area of the at least one transmit beam.

Aspect 24 is a method of any of aspects 22 and 23, further including: providing, for the UE, an indication that the clutter information includes one of a set of absolute clutter measurements or a set of differential clutter measurements.

Aspect 25 is an apparatus for wireless communication at a UE. The apparatus includes memory; and at least one processor coupled to the memory and, based at least in part on information stored in the memory, the at least one processor is configured to implement any of aspects 1 to 10.

Aspect 26 is the apparatus of aspect 25, further including at least one of a transceiver or an antenna coupled to the at least one processor.

Aspect 27 is an apparatus for wireless communication at a network entity. The apparatus includes memory; and at least one processor coupled to the memory and, based at least in part on information stored in the memory, the at least one processor is configured to implement any of aspects 11 to 24.

Aspect 28 is the apparatus of aspect 27, further including at least one of a transceiver or an antenna coupled to the at least one processor.

Aspect 29 is an apparatus for wireless communication including means for implementing any of aspects 1 to 10.

Aspect 30 is an apparatus for wireless communication including means for implementing any of aspects 11 to 24.

Aspect 31 is a computer-readable medium (e.g., a non-transitory computer-readable medium) storing computer executable code, where the code when executed by a processor causes the processor to implement any of aspects 1 to 10.

Aspect 32 is a computer-readable medium (e.g., a non-transitory computer-readable medium) storing computer executable code, where the code when executed by a processor causes the processor to implement any of aspects 11 to 24.

What is claimed is:

1. An apparatus of wireless communication at a user equipment (UE), comprising:

memory; and at least one processor coupled to the memory and, based at least in part on information stored in the memory, the at least one processor is configured to:

obtain assistance data based on a set of clutter measurements associated with a plurality of network nodes;

update a radio frequency (RF) sensing session based on the assistance data;

receive pattern information for at least one transmit beam of a network node; and selectively perform at least one measurement of a set of measurements of a sensing reference signal associated with the at least one transmit beam based on the updated RF sensing session and the pattern information.

2. The apparatus of claim 1, wherein the at least one processor is further configured to:

receive a non-line-of-sight (NLOS) signal reflected by a target entity; and estimate an angle-of-departure (AoD) of the NLOS signal based at least on the pattern information for the at least one transmit beam.

3. The apparatus of claim 2, wherein the pattern information comprises at least one of:

a boresight direction of the at least one transmit beam; or a width of the at least one transmit beam.

4. The apparatus of claim 2, wherein the at least one processor is further configured to:

receive clutter information for the at least one transmit beam of the network node; and wherein to estimate the AoD of the NLOS signal, the at least one processor is configured to:

estimate the AoD of the NLOS signal based on the pattern information of the at least one transmit beam and the clutter information.

5. The apparatus of claim 4, wherein the clutter information indicates a coverage area of the at least one transmit beam.

6. The apparatus of claim 4, wherein the at least one processor is further configured to:

receive an indication that the clutter information comprises one of a set of absolute clutter measurements or a set of differential clutter measurements.

7. The apparatus of claim 1, wherein the assistance data comprises a set of differential clutter measurements.

8. The apparatus of claim 1, wherein the at least one processor is further configured to:

receive one or more RF sensing serving qualities for one or more areas associated with the plurality of network nodes, wherein to perform the set of measurements based on the updated RF sensing session, the at least one processor is configured to:

perform the set of measurements for a respective area of the one or more areas having a respective RF sensing serving quality of the one or more RF sensing serving qualities that meets or exceeds a threshold condition.

9. The apparatus of claim 1, further comprising at least one of a transceiver or an antenna coupled to the at least one processor, wherein to obtain the assistance data based on the set of clutter measurements, the at least one processor is configured to:

receive, from a network entity via at least one of the transceiver or the antenna, the assistance data based on the set of clutter measurements.

10. An apparatus of wireless communication at a network entity, comprising:

memory; and at least one processor coupled to the memory and, based at least in part on information stored in the memory, the at least one processor is configured to:

provide a first indication of a signaling scheme for a set of clutter measurements associated with a plurality of network nodes;

receive, based on the signaling scheme, a first subset of the set of the clutter measurements from the plurality of network nodes, wherein the first subset comprises a set of absolute clutter measurements of the set of clutter measurements, wherein the set of absolute clutter measurements has a first periodicity;

receive a second subset of the set of clutter measurements, wherein the second subset comprises a set of differential clutter measurements of the set of clutter measurements, wherein the set of differential clutter measurements has a second periodicity that is shorter than the first periodicity; and provide, for a user equipment (UE), assistance data based on the set of clutter measurements.

11. The apparatus of claim 10, wherein the assistance data comprises a clutter distribution that is based on the set of clutter measurements.

12. The apparatus of claim 10, wherein the at least one processor is configured to:

provide a threshold for the set of differential clutter measurements by which each of the plurality of network nodes determines which of the set of differential clutter measurements are to be provided.

13. The apparatus of claim 10, wherein the at least one processor is configured to:

receive antenna coordinate and orientation information from the plurality of network nodes.

14. The apparatus of claim 10, wherein the at least one processor is configured to:

indicate, based on the set of clutter measurements, a radio frequency (RF) sensing serving quality of a particular sensing area associated with the plurality of network nodes.

15. The apparatus of claim 10, wherein the at least one processor is configured to:

provide, based on pattern information for at least one transmit beam of one of the plurality of network nodes, a request to beamform towards a particular sensing area associated with the plurality of network nodes, wherein the particular sensing area is associated with an RF sensing serving quality that meets or exceeds a threshold condition.

16. The apparatus of claim 10, wherein the at least one processor is configured to:

provide, based on pattern information for at least one transmit beam of one of the plurality of network nodes, a request to utilize one or more particular beams in a plurality of beams for an RF sensing session.

17. The apparatus of claim 10, wherein the assistance data comprises a set of differential clutter measurements.

18. The apparatus of claim 10, wherein the at least one processor is configured to:

provide, for the UE, pattern information for at least one transmit beam of at least one network node of the plurality of network nodes.

19. The apparatus of claim 18, wherein the pattern information comprises at least one of:

a boresight direction of the at least one transmit beam; or a width of the at least one transmit beam.

20. The apparatus of claim 10, wherein the at least one processor is configured to:

provide, for the UE, clutter information for at least one transmit beam of at least one network node of the plurality of network nodes.

21. The apparatus of claim 20, wherein the clutter information indicates a coverage area of the at least one transmit beam.

22. The apparatus of claim 20, further comprising at least one of a transceiver or an antenna coupled to the at least one processor, wherein the at least one processor is configured to:

provide, for the UE via at least one of the transceiver or the antenna, an indication that the clutter information comprises one of a set of absolute clutter measurements or a set of differential clutter measurements.

23. A method of wireless communication at a user equipment (UE), comprising:

obtaining assistance data based on a set of clutter measurements associated with a plurality of network nodes;

updating a radio frequency (RF) sensing session based on the assistance data;

receiving pattern information for at least one transmit beam of a network node; and selectively performing at least one measurement of a set of measurements of a sensing reference signal associated with the at least one transmit beam based on the updated RF sensing session and the pattern information.

24. The method of claim 23, further comprising:

receiving a non-line-of-sight (NLOS) signal reflected by a target entity; and estimating an angle-of-departure (AoD) of the NLOS signal based at least on the pattern information for the at least one transmit beam.

25. The method of claim 24, wherein the pattern information comprises at least one of:

a boresight direction of the at least one transmit beam; or a width of the at least one transmit beam.

26. A method of wireless communication at a network entity, comprising:

providing a first indication of a signaling scheme for a set of clutter measurements associated with a plurality of network nodes;

receiving, based on the signaling scheme, a first subset of the set of the clutter measurements from the plurality of network nodes, wherein the first subset comprises a set of absolute clutter measurements of the set of clutter measurements, wherein the set of absolute clutter measurements has a first periodicity;

receiving a second subset of the set of clutter measurements, wherein the second subset comprises a set of differential clutter measurements of the set of clutter measurements, wherein the set of differential clutter measurements has a second periodicity that is shorter than the first periodicity; and providing, for a user equipment (UE), assistance data based on the set of clutter measurements.

27. The method of claim 26, wherein the assistance data comprises a clutter distribution that is based on the set of clutter measurements.

* * * * *